Patented Oct. 4, 1932

1,880,559

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE BENZOYLATION OF CELLULOSE

No Drawing. Application filed December 14, 1929. Serial No. 414,204.

This invention relates to a process for the preparation of a cellulose benzoate and particularly to the benzoylation of the cellulose in the presence of ethylene chloride.

There are several known methods for the preparation of cellulose benzoate but primarily they are covered either by a treatment of the cellulose with a solution of benzoyl chloride, pyridine and nitrobenzene, as described by Dr. Alfred Wohl in German Patent No. 139,669 or by first mercerizing the cellulose and then benzoylating it in a heated bath containing benzoyl chloride. The disadvantages found in the first process are primarily that the cellulose is considerably degraded by the high temperature at which the benzoylation is required to be conducted, owing to the fact that the nitrobenzene, which is present as a solvent, does not act as a solvent until a high temperature is reached. In effecting benzoylation by this process, therefore, degradation of the cellulose is unavoidable. In the latter process, it is necessary in the preparation of the soda cellulose or mercerized cellulose to treat the cellulose with a strong alkali for periods up to as great as twenty-four hours. This treatment naturally breaks down the cellulose molecule and, with the resulting high temperature benzoylation process produces a product of very poor quality.

An object of the present invention is to provide a process for the benzoylation of cellulose at relatively low temperature. Another object of this invention is to effect a substantially undegraded benzoylation of cellulose in the presence of a suitable solvent. Other objects will hereinafter appear.

We have found that cellulose can be readily benzoylated at low temperature with resulting slight degradation of the cellulose by conducting the reaction in the presence of ethylene chloride, which acts as a solvent for the cellulose benzoate produced, at temperatures as low as 80° C. This reaction is conducted preferably in the presence of the usual benzoylating reagents, such as benzoyl chloride and pyridine.

In order to effect complete benzoylation by the former known processes, it was found generally necessary to conduct the treatment at a temperature above the boiling point of the reacting constituents. It was, therefore, necessary to effect the benzoylation in an autoclave at high pressures, this high pressure and increased temperature, of course, aggravating the degradation of the cellulose benzoate produced. By our process, on the other hand, we are enabled to conduct benzoylation under normal atmospheric pressure, the cellulose with the benzoyl chloride, pyridine and ethylene chloride being placed in a suitable jacketed container to which has been affixed a vertical condenser of the reflux-condenser type. Live steam is passed through the jacket of the container, thus heating the mass to its boiling point, which is somewhat under 100° C. By conducting the reaction at this temperature, which requires generally from 18 to 24 hours, very slight, if any, degradation of the cellulose benzoate produced is noticeable.

We have found that by effecting the benzoylation with as little as 20% ethylene chloride, based upon the weight of the benzoylating bath, the beneficial results from its use can be obtained. In practice, however, we have found that a 50—40 mixture of the ethylene chloride and the other benzoylation reagents, such as benzoyl chloride and pyridine is preferable, although a somewhat larger percentage of ethylene chloride may be employed without markedly depressing the reaction. It is, of course, understood that the rate of reaction will decrease inversely in proportion to the quantity of ethylene chloride used above a 50—50 mixture.

After the cellulose has been benzoylated to the desired extent, the whole mass may be precipitated by adding a non-solvent thereto or by rapid evaporation of the ethylene chloride by pouring the mass into a hot non-solvent solution, such as boiling water. The boiling point of the ethylene chloride being 83.7° C., the ethylene chloride will rapidly flash from the solution and can be readily collected and condensed for further use. The cellulose benzoate will likewise be precipitated in the aqueous solution in a light, fluffy mass which can be readily washed, dried and redissolved in the solvent desired.

We shall now give an example to illustrate an operable method for conducting our disclosed invention, but it will be understood that we shall not be limited by the details therein given except as they are indicated in the appended claims. Two parts of absorbent cotton or similar cellulosic material may be placed in a suitable container fitted with a vertical or reflux condenser and 11½ parts of benzoyl chloride, 8 parts of pyridine and 20 parts of ethylene chloride added. The container is heated by steam for a period of 18 to 24 hours or more until the acylated cellulose has gone into solution or until the desired benzoyl groups have combined with the cellulose, the evaporated volatile constituents from the bath being condensed in the reflux and returned to the bath. Because of this method, there is slight, if any, loss of the volatile constituents. The product may be then precipitated in hot water and after washing with ethanol or other suitable solvent for pyridine, ethylene chloride and benzoyl chloride, a cellulose benzoate will be obtained having exceptional qualities.

In carrying out this invention it will be understood that various proportions of the ingredients as described in the above example may be employed or the temperature of the reaction may vary considerably, providing ethylene chloride, in the amounts specified, be employed without sacrificing the quality of the cellulose benzoate produced or otherwise departing from this invention.

What we claim as our invention and desire to be secured by Letters Patent of the United States is:

1. A process for the manufacture of cellulose benzoate which comprises benzoylating the cellulose in the presence of the ethylene chloride.

2. A process for the manufacture of cellulose benzoate which comprises treating the cellulose in the presence of benzoyl chloride, pyridine, and ethylene chloride.

3. A process for the manufacture of cellulose benzoate which comprises treating the cellulose in the presence of benzoyl chloride and pyridine at atmospheric pressure.

4. A process for the manufacture of cellulose benzoate which comprises treating the cellulose in the presence of benzoyl chloride, pyridine, and ethylene chloride, the benzoylation being effected while refluxing the more volatile constituents of the benzoylation bath.

5. A process for the manufacture of cellulose benzoate which comprises benzoylating 10 parts of cellulose by acting thereon with a bath containing approximately 11 parts of benzoyl chloride, 8 parts of pyridine and 20 parts of ethylene chloride at a temperature below 100° C.

Signed at Springfield, Mass., this 3rd day of December 1929.

CHARLES S. WEBBER.

Signed at Rochester, New York, this 6th day of Dec. 1929.

CYRIL J. STAUD.